United States Patent [19]
Nakamura

[11] Patent Number: 5,337,627
[45] Date of Patent: Aug. 16, 1994

[54] BALL SCREW

[75] Inventor: Nobuyuki Nakamura, Sakakimachi, Japan

[73] Assignee: Nissei Plastic Industrial Co., Ltd., Japan

[21] Appl. No.: 997,494

[22] Filed: Dec. 28, 1992

[30] Foreign Application Priority Data

Dec. 27, 1991 [JP] Japan .................. 3-359255
Mar. 18, 1992 [JP] Japan .................. 4-091483

[51] Int. Cl.⁵ .......................................... F16H 25/22
[52] U.S. Cl. ........................... 74/459; 74/424.8 R
[58] Field of Search ............. 74/424.8 R, 441, 459

[56] References Cited

U.S. PATENT DOCUMENTS

| | | | |
|---|---|---|---|
| 1,831,080 | 11/1931 | Schmidt | 74/459 |
| 2,343,507 | 3/1944 | Hoffar | 74/459 |
| 4,896,552 | 1/1990 | Virga | 74/459 |

FOREIGN PATENT DOCUMENTS

| | | | |
|---|---|---|---|
| 922095 | 1/1955 | Fed. Rep. of Germany | 74/459 |
| 136126 | 5/1960 | U.S.S.R. | 74/441 |
| 497438 | 3/1976 | U.S.S.R. | 74/424.8 R |
| 1317212 | 6/1987 | U.S.S.R. | 74/424.8 R |
| 1427123 | 9/1988 | U.S.S.R. | 74/424.8 R |

Primary Examiner—Allan D. Herrmann
Attorney, Agent, or Firm—Ostrolenk, Faber, Gerb & Soffen

[57] ABSTRACT

A ball screw comprising a screw shaft and a nut into which the screw shaft is screwed through a multiplicity of balls, the screw shaft having thereon a series of alternate threads and grooves changing partly in pitch, a flexible ball receiver provided integrally within the nut for allowing the balls to move axially of the receiver depending on a change in the pitch of threads on the screw shaft, and a ball return guide provided outside or inside the nut for changing the feed speed or torque of the ball screw automatically.

12 Claims, 5 Drawing Sheets

BALL SCREW

BACKGROUND OF THE INVENTION

1. Field of the Invention

The present invention relates to ball screws used for transferring/tightening an object in a machine tool or in a molding machine.

2. Background Art

As disclosed in U.S. Pat. No. 1,831,080, a conventional ball screw has a structure in which a screw shaft with threads having an equal pitch is screwed into a nut through a multiplicity of balls such that when any one of the screw shaft and the nut is rotated, the other is moved axially through threads to move or tighten the object.

The problem with this prior art is that the feed speed and torque are at all times constant because the thread pitch is constant. Therefore, so far as the rotational speed does not change, the feed speed and torque cannot be changed in the course of feeding the screw shaft or the nut.

As disclosed in published unexamined Japanese patent application Sho. 63 (1988)-3920, such problem is solved by providing threads different in pitch to each of ends of the screw shaft, and a nut on each of the ends of the screw shaft, wherein when a high-speed low-torque is required, a nut for a smaller pitch is turned to feed the screw shaft out while when a low-speed high-torque is required, the screw shaft is rotated to feed out a nut for a larger pitch.

However, since the conventional structure requires means for turning one nut, means for rotating the screw shaft and means for switching between the rotation of the screw shaft and that of the nut, the overall structure is complicated and much time is required for operating such ball screw.

SUMMARY OF THE INVENTION

The present invention contemplates the solution of the above problems with the conventional ball screw. It is an object of the present invention to provide a new-structured ball screw which changes partly the pitch of successive threads on the screw shaft and hence the movement of the balls to thereby automatically change the feed speed and torque.

In order to achieve the above object, the present invention provides a ball screw comprising:

screw shaft means having thereon a series of alternate threads and grooves changing partly in pitch;

nut means into which the screw shaft is screwed through a multiplicity of balls received in the grooves on the screw shaft means;

flexible ball receiver means provided integrally within the nut for allowing the balls to move axially of the receiver means depending on a change in the pitch of threads on the screw shaft means; and return guide means provided outside the nut means and having a portion extending through the nut means for returning the balls therethrough to the grooves on the screw shaft means.

The ball receiver means comprises a coil spring having coils wound around the outer periphery of the screw shaft means along the grooves on the screw shaft, each coil having a ball groove on its surface facing a corresponding groove on the screw shaft.

The return guide for the balls includes a return groove on the nut side of the ball receiver communicating with a ball groove on the screw shaft side while the ball return guide outside the nut includes a helical pipe extendable axially of the ball receiver and wound helically around the outer periphery of the nut.

The thread pitch of the screw shaft is larger in the middle portion of the screw shaft and smaller in the shaft ends. In the inventive ball screw, when the thread pitch of the screw shaft changes, the respective intervals between the coils of the flexible ball receiver are compressed or extended axially by the balls in the groove to change so as to be equal to the changed thread pitch. Therefore, any one of the nut and the screw shaft is moved axially by rotation without being influenced by the pitch change.

The moving speed and torque of the shaft or the nut are changed depending on a change in the thread pitch to automatically provide a high-speed low-torque or a low-speed high-torque.

Such ball screw may be employed in a feed mechanism or tightening mechanism of machine tools or molding machines. The rotational means may be similar to conventional constant-speed rotational means, and when the speed or torque is required to be changed, a switching mechanism such as is used in the past is not required. Thus, the rotational means in the present embodiment is easily applied as a simplified feed mechanism to various devices.

By constructing the ball receiver with a flexible material such as a coil spring, a resiliency acts at the start-up, so that smooth start-up is achieved as well as possible shocks occurring when the speed or pressure is changed are absorbed to thereby remove a backlash.

BRIEF DESCRIPTION OF THE DRAWINGS

The drawings schematically illustrate embodiments of a ball screw according to the present invention and a clamping device which employs such ball screw, in which drawings.

DETAILED DESCRIPTION OF THE PREFERRED EMBODIMENTS

Figure 1:
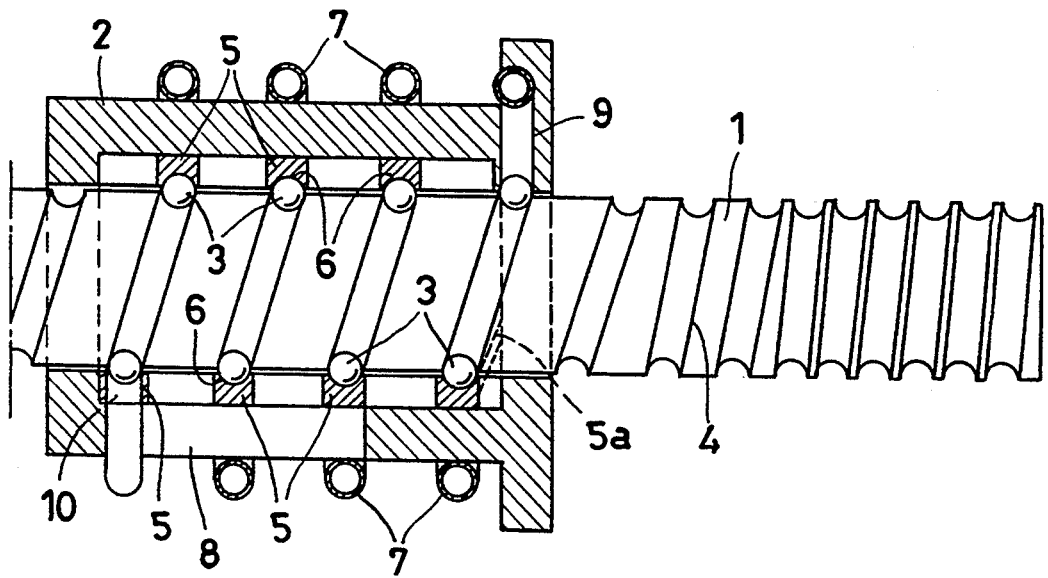
FIG. 1 is a partially cross-sectional side view of the essential portion of a ball screw.
Figure 2:
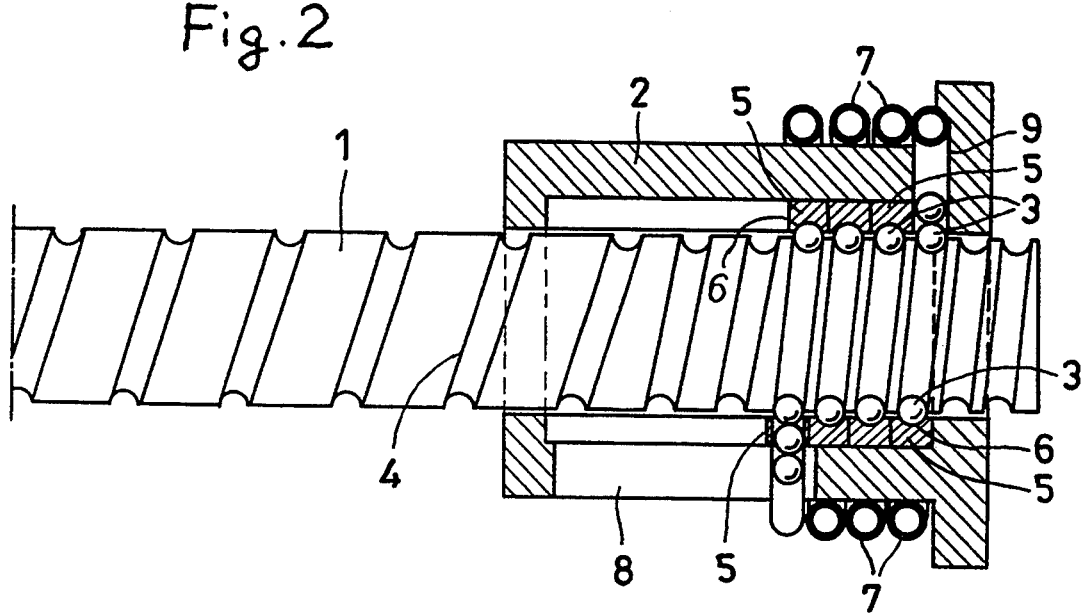
FIG. 2 is a partially cross-sectional side view of the essential of the ball screw when the interval between the coils of a ball receiver changes in correspondence to a screw pitch.
Figure 3:
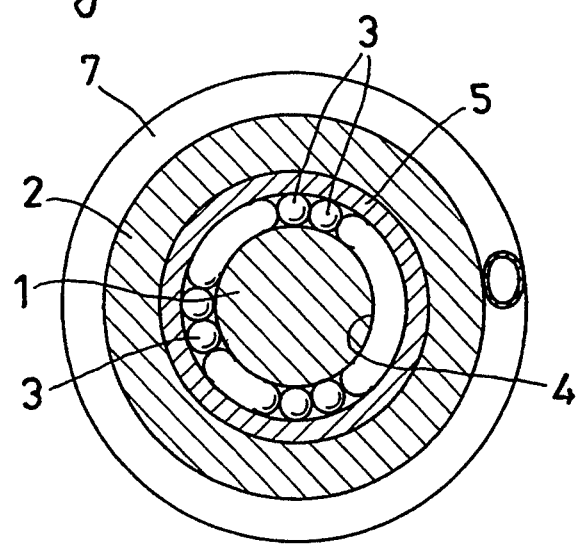
FIG. 3 is a cross-sectional end view of the essential portion of the ball screw.

FIGS. 1–3 show an embodiment of a ball screw according to the present invention where a return guide for balls is provided outside a nut.

In FIGS. 1–3, reference numeral 1 denotes a screw shaft; 2, a nut; and 3, a multiplicity of steel balls. The screw shaft 1 has thereon alternate successive threads 4 and grooves, each groove having the same width. The thread pitch 4a of the middle portion of the screw shaft 1 is larger than the thread pitch 4b of the screw ends. (See FIGS. 4 and 5)

The nut 2 has a body having a length which covers a plurality of thread pitches and an inner resilient ball receiver 5 which allows the axial movement of balls 3 depending on a change in the thread pitch.

The ball receiver 5 of the present embodiment is composed of a coil spring having a square cross-section wound around the screw shaft 1 along the groove on the threads 4, each of the spring coils having a ball groove 6 formed on its surface facing a respective groove on the screw shaft.

The coil spring 5 is fastened at one end 5a to the nut 2 such that the ball receiver 5 rotates along with the nut 2 while it is compressed or extended axially of the receiver 5 by the pressure of the balls 3.

The overall axial length of the ball receiver 5 is determined depending on the smaller thread pitch 4b such that when the balls 3 are arranged at the smaller thread pitch 4b, the ball receiver 5 is completely compressed and hence the coils of the ball receiver 5 contact one against the other, as shown in FIG. 2.

The nut 2 is provided with an axially long slot 8 for a return guide 7 made of a helical pipe wound around the outer periphery of the nut 2. The return guide 7 is fixed at one end to a guide hole 9 provided in an end of the nut 2 so as to communicate with the hole 9 and communicates at the other end from the slot 8 to a through ball hole 10 provided in a free end of the ball receiver 5 so as to move axially along with the ball receiver 5.

When the ball screw is used, either one of the screw shaft 1 and the nut 2 is connected to a movable member (not shown) and the other is connected to rotational means of a fixture (not shown), such that when one of the screw shaft 1 and the nut 2 rotates at a predetermined position, the other moves axially linearly.

As the screw shaft 1 or the nut member 2 moves, the balls 3 move axially relative to one another. Since the ball receiver 5 is in an axially movable state, it is either compressed or extended axially by the balls 3 in the groove.

Thus, the pitches of the coils of the ball receiver 5 adjust to the thread pitches 4a or 4b while the receiver 5 is receiving the balls 3, so that no relative positional deviation in screw groove between the screw shaft and the ball receiver occurs and no balls 3 are bitten by each other. Therefore, even if the thread pitch changes intermediate the series of threads 4, no hindrance occurs to the movement of the shaft 1 or the nut 2, and hence its speed and torque change automatically smoothly.

Since the return guide 7 is fastened at one end in the guide hole 9 in the nut 2 so as to communicate with the hole 9 and also communicates at the other end with the ball hole 10 in the ball receiver 5 such that the other end of the return guide 7 is moved by the ball receiver 5 axially in the slot 8, the return guide 7 is axially extended or compressed. Since the ball receiver 5 and the return guide 7 do not change in the ball path length, the return of the balls 3 is performed smoothly irrespective of changes in the pitch of the coils of the ball receiver 5 and the return guide 7.

Figure 4:
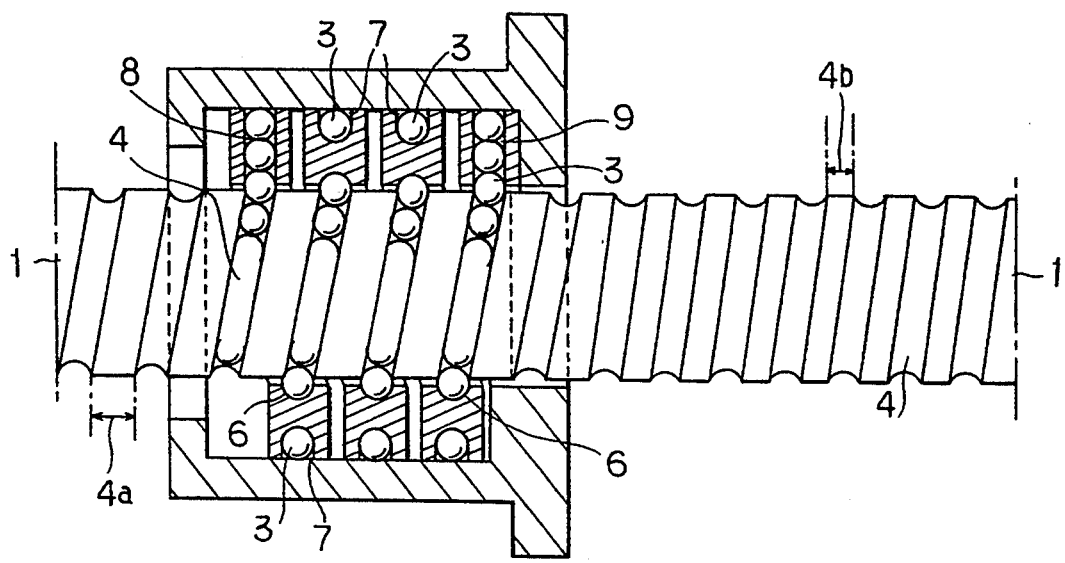
FIG. 4 is a partially cross-sectional side view of the essential portion of another embodiment of the inventive ball screw.
Figure 5:
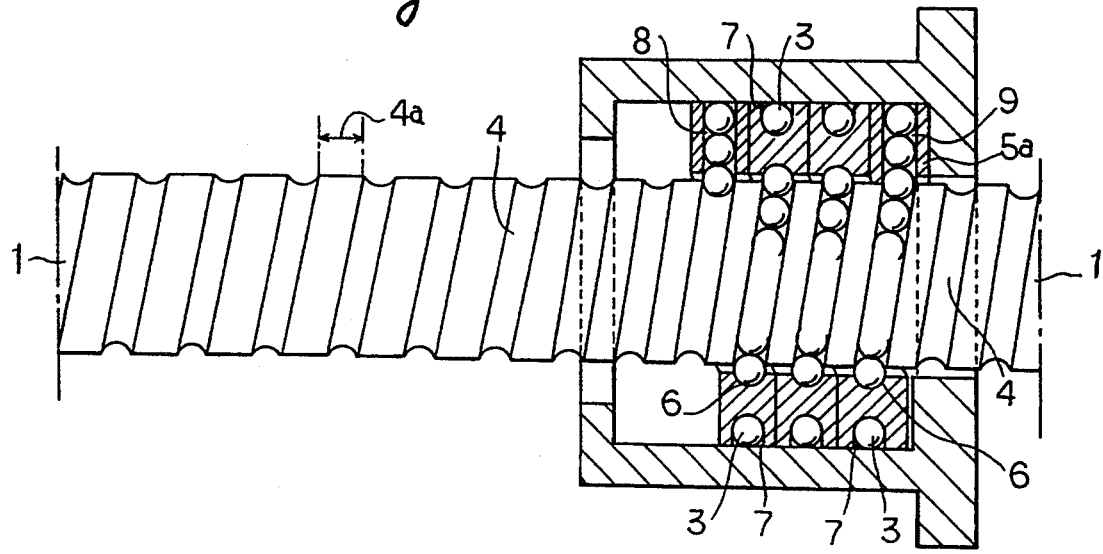
FIG. 5 is a partially cross-sectional side view of the essential of the ball screw when the interval between the coils of a ball receiver changes in correspondence to a screw pitch.
Figure 6:
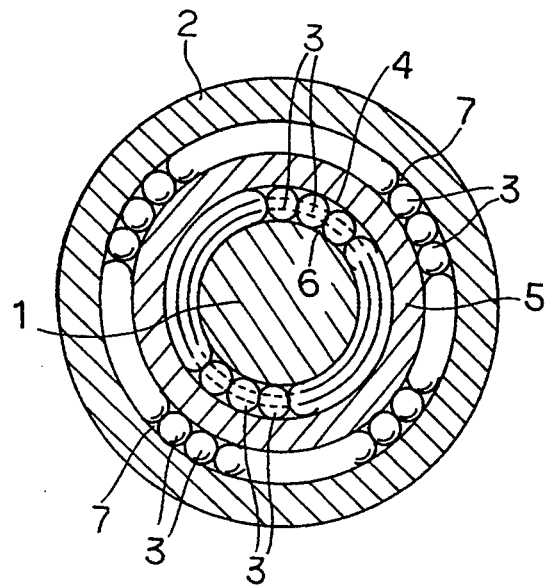
FIG. 6 is a cross-sectional end view of the essential portion of the ball screw of FIG. 5.

FIGS. 4–6 show an embodiment with a ball return guide provided on the inner side of a nut.

According to this embodiment, the respective inner surfaces of the coils of the ball receiver 5 facing the grooves 4 are each provided with a ball groove 6 having the same width and depth as the groove 4 on the screw shaft. The ball receiver 5 is provided on the nut-side outer surfaces of the coils with corresponding return grooves 7 for the balls 3 and similar and parallel to the ball grooves 6. The return groove 7 communicates at ends through paths 8 and 9 with the ball groove 6 so as to recirculate the balls 3 sequentially therethrough.

Such ball screw is used such that any one of the shaft 1 and the nut 2 is connected to a movable member (not shown) while the other is connected to rotational means of a fixture (not shown) so that when one of the screw shaft 1 and the nut 2 rotates at its predetermined position, the other moves axially and linearly.

As the screw shaft 1 or nut 2 moves axially, the balls 3 move axially relative to each other. Since the ball receiver 5 is also movable axially, it is compressed or extended axially by the balls 3 in the grooves.

Thus, the nut-side return grooves 7 in the ball receiver 5 are extended or compressed axially of the ball receiver 5 along with the ball receiver 5, so that the balls 3 are smoothly returned regardless of changes in the thread pitch.

Figure 7:
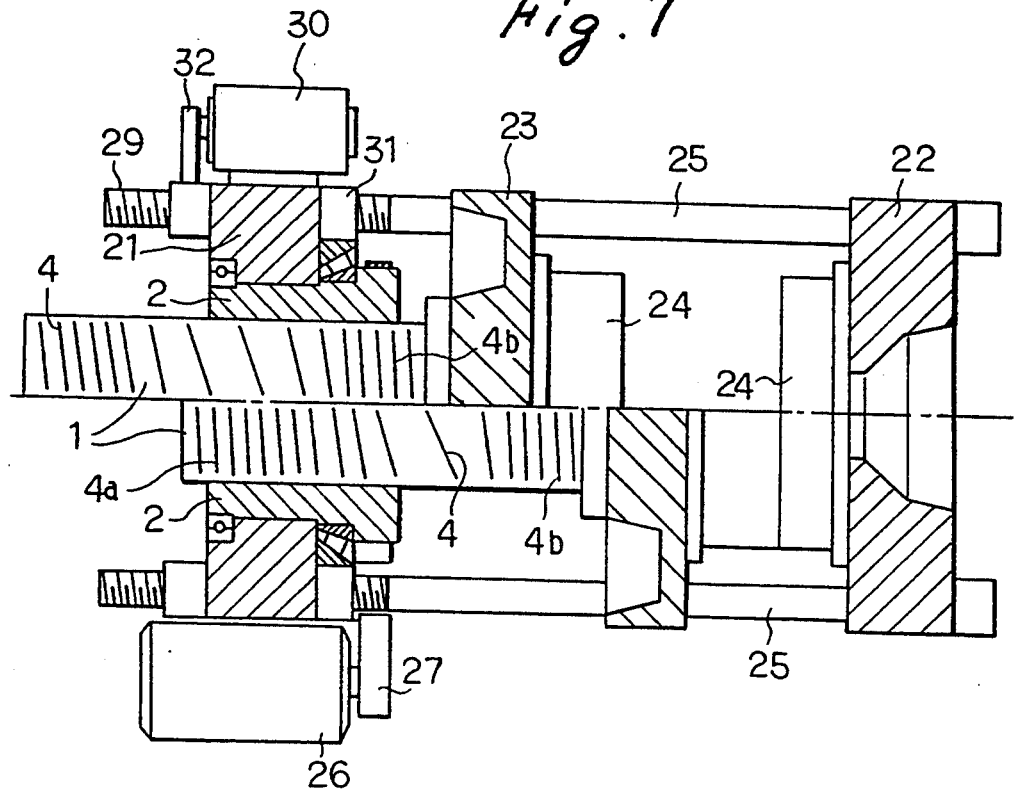
FIG. 7 is a schematic plan view of the essential portion of a molding machine in which the inventive ball screw is applied to a single clamping ram having a large diameter in the clamping device, which is shown in the open/closed states.
Figure 8:
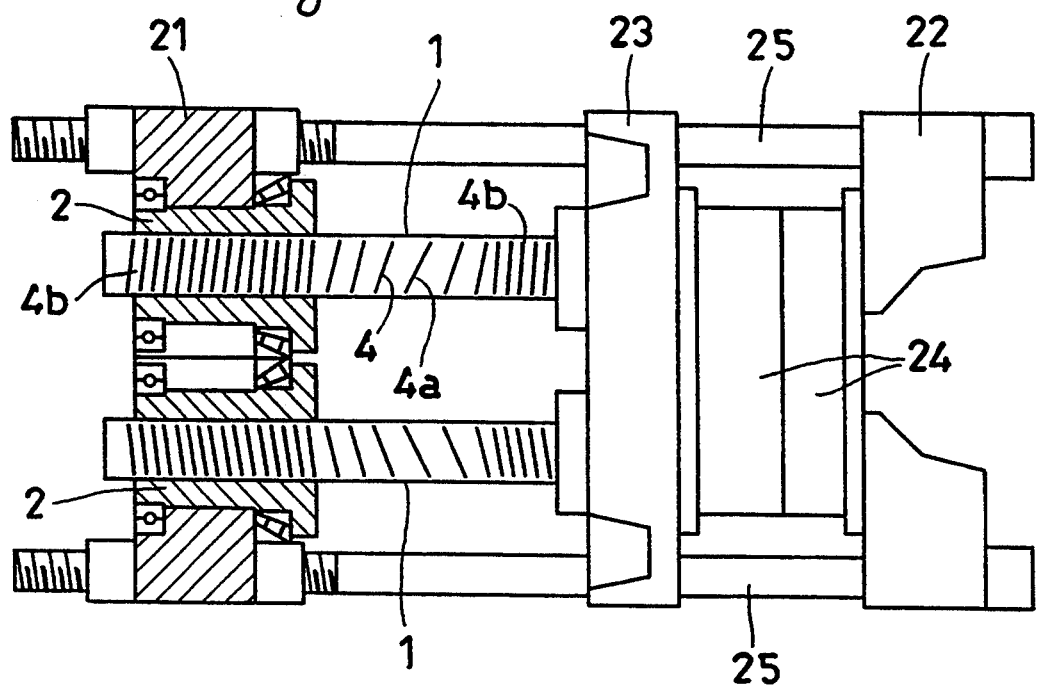
FIG. 8 is a schematic plan view of the essential portion of a molding machine in which a plurality of ball screws is used as clamping rods in the clamping device, which is shown in a closed state.
Figure 9:
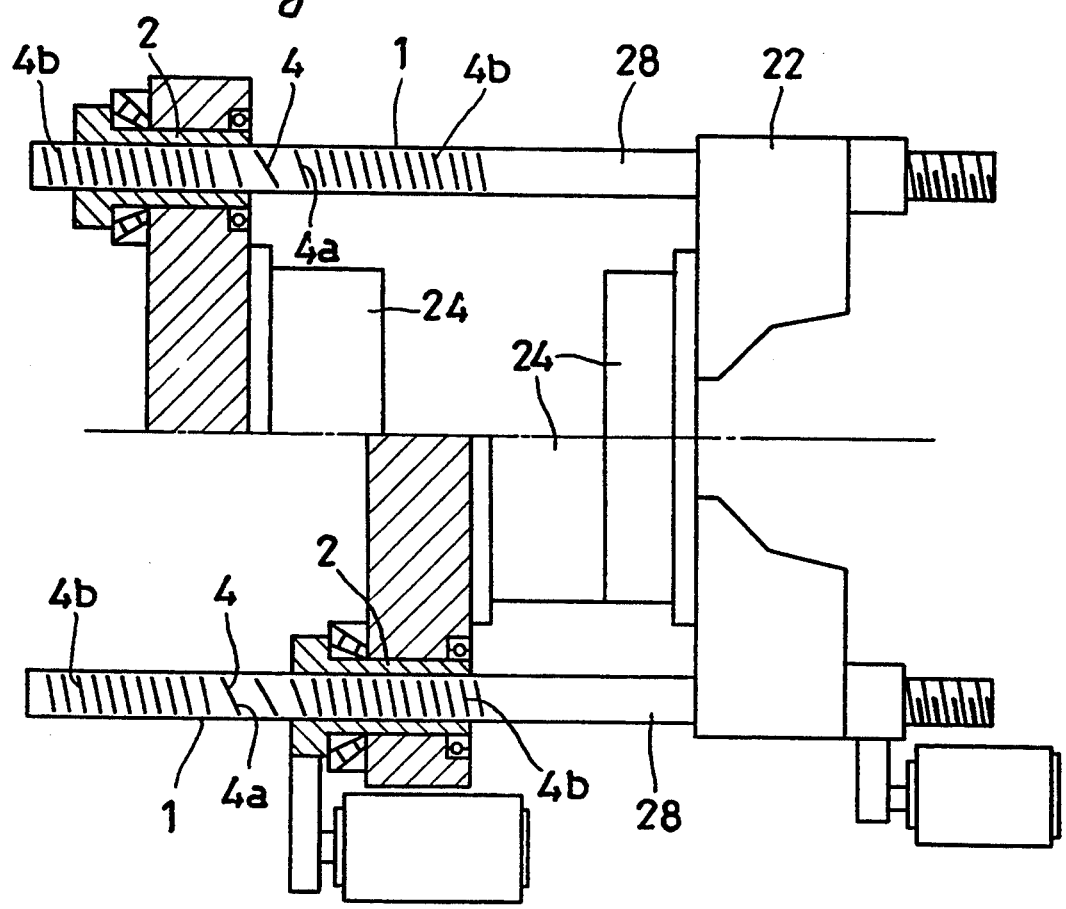
FIG. 9 is a schematic plan view of the essential portion of a molding machine in which a plurality of ball screws is used as clamping rods at four corners of a fixed plate in the clamping device, which is shown in a closed state.

FIGS. 7–9 show a clamping device of a molding machine to which the inventive ball screw is applied.

In those Figures, reference numerals 21, 22 each denote a fixed plate; 23, a movable plate; 24, split molds attached to the corresponding opposing surfaces of the fixed and movable plates 22 and 23; and 25, tie bars.

In the ball screw used, the screw shaft 1 has a larger thread pitch 4a on its middle portion and a smaller thread pitch 4b on its end portions so as provide low-speed opening/closing of the split molds.

FIG. 7 shows the use of a ball screw having a large diameter as a single clamping ram. A screw shaft 1 is connected to the center of a back of the movable plate 23 while a nut 2 is provided rotatably at the center of the fixed plate 21. A clamping motor 26 such as a servo motor is attached to the fixed plate 21 such that the motor 26 rotates the nut 2 at a predetermined position through a transmission member such as a timing belt 27 to thereby move linearly the screw shaft 1 and hence the movable plate 23 and to open/close and clamp the molds 24.

FIG. 8 shows a clamping device where a plurality of parallel screw shafts 1 having a small diameter is connected as clamping rods to a back of a movable plate 23 with nuts 2 which receive the shafts 1 being juxtaposed rotatably. The screw shafts 1 have threads 4 opposite in direction to prevent torsion thereof.

Also, in this case, the rotation of the nuts 2 is performed by a clamping motor (not shown) 9, for example, through a timing belt (not shown) such that the screw shafts 1 move axially and linearly to open/close and clamp the molds 24.

FIG. 9 shows that some of clamping rods 28 one provided at each of four corners of a fixing plate 22 include screw shafts 1. The guide portions of clamping rods 28 for a movable plate 23 are screw shafts 1. Nuts 2 are provided rotatably one at each of four corners of the movable plate 23 to which a clamping motor 26 is attached to rotate the nuts 2 through a transmission member 27 to thereby move the movable plate 23 along the screw shafts provided at fixed positions to open/close and clamp the molds 24. Also, in this case, the diagonally disposed screw shafts have threads 4 opposite in direction thereon in order to prevent torsion of the respective screw shafts at the four corners.

Since any of the screw shafts 1 has threads with a smaller pitch at its ends than at its middle portion, the movable plate 23 moves at a low-speed high-torque at the beginning of its clamping. When the movable plate 23 arrives at the middle portion of the screw shafts 1 with threads of a larger pitch, the movable plate 23 moves at a higher speed. When the movable plate arrives at the ends of the screw shafts 1, its speed becomes lower automatically to thereby clamp the molds 24 slowly at higher torque because the pitch of the threads on the shafts is smaller.

In FIG. 7, reference 29 denotes a mold thickness adjusting screw provided on each of movable plate guide portions of tie bars 25; 30, a mold thickness adjusting motor attached to the movable plate 23; 31, a mold thickness adjusting nut provided rotatable in the movable plate 23 and through which nut a respective one of the screw shafts is screwed; and 32, a rotating belt extending around the mold thickness adjusting motor 30 and the mold thickness adjusting nut 31.

What is claimed is:

1. A ball screw comprising:
   screw shaft means having thereon a series of alternate threads and grooves which change in pitch over the length of the shaft means;
   a multiplicity of balls received in the grooves on the screw shaft means; nut means surrounding the balls in the grooves, and through which the screw shaft means is screwed;
   flexible ball receiver means provided within the nut for allowing the locations of the balls along the nut to move axially along the nut and to move along with the receiver means depending on a change in the pitch of the threads on the screw shaft means which are then surrounded by the nut means; and
   return guide means provided outside the nut means and having a portion extending through the nut means for returning the balls therethrough to the grooves on the screw shaft means.

2. A ball screw according to claim 1, wherein the return guide means comprises a helical pipe disposed around the outer periphery of the nut means and having opposite ends which both extend through the nut to spaced apart locations along the groove, the helical pipe being extendable and compressible axially of the nut means as the pitch of the threads varies.

3. A ball screw according to claim 2, wherein said ball receiver means comprises a coil spring having coils wound around the outer periphery of said screw shaft means along the grooves on said screw shaft means, each coil having a ball groove on its surface facing a corresponding groove on said screw shaft means.

4. A ball screw according to claim 2, wherein said screw shaft means has a larger pitch of threads on a middle portion thereof and a smaller pitch of threads on an end portion thereof.

5. A ball screw according to claim 1, wherein said ball receiver means comprises a coil spring having coils wound around the outer periphery of said screw shaft means along the grooves on said screw shaft means, each coil having a ball groove on its surface facing a corresponding groove on said screw shaft means.

6. A ball screw according to claim 1, wherein said screw shaft means has a larger pitch of threads on a middle portion thereof and a smaller pitch of threads on an end portion thereof.

7. A ball screw comprising:
   screw shaft means having thereon a series of alternate threads and grooves which change in pitch over the length of the shaft means;
   a multiplicity of balls received in the grooves on the screw shaft means; nut means surrounding the balls in the grooves, and through which the screw shaft means is screwed;
   flexible bal receiver means provided within the nut means for allowing the locations of the balls along the nut to move axially along the nut and to move along with the receiver means depending on a change in the pitch of the threads on said screw shaft means which are then surrounded by the nut means; and
   return guide means provided on the side of the ball receiver means toward the nut means, the guide means having a return groove communicating with one of the ball grooves between threads on the screw shaft means.

8. A ball screw comprising:
   a screw shaft having a series of alternate threads and grooves formed thereon, with the pitch of the threads and the grooves varying over the length of the shaft;
   a nut inside which the screw is disposed and the nut being moveable along the screw; a multiplicity of balls received in the respective ones of the grooves which are then surrounded by the nut;
   a flexible ball receiver provided inside the nut and extending around the balls in the grooves in the nut, the ball receiver having an interior side shaped for receiving and supporting the balls in the grooves, the ball receiver being flexible such that as the nut moves along the shaft to surround different pitch grooves, the ball receiver is flexible to move along the nut to adapt its interior side to the change in groove pitch so that it remains around the balls in the grooves then surrounded by the nut; and
   return guide means located radially outward of the portion of the ball receiver which receives the balls and being so connected with the ball receiver as to adjust in position along the nut as the ball receiver shifts with the change in the pitch of the grooves; the return guide means including a first portion extending to one of the grooves to communicate with the balls in the one groove and a second portion spaced from the first portion and extending to a second one of the grooves to communicate with the balls in the second groove.

9. The ball screw of claim 8, wherein the flexible ball receiver comprises a receiving element wrapped around the shaft with a series of windings respectively corresponding to the grooves in the shaft and the windings being over respective grooves, the windings including an interior surface with means thereon for engaging the balls in the grooves then surrounded by the receiving element and the nut; the receiving element being flexible so that the spaces being windings thereof readjust along the nut as the nut moves along the shaft and as the pitch of the grooves varies with the different positions of the nut and of the receiving means inside the nut along the shaft.

10. The ball screw of claim 9, wherein the receiving element comprises a coil spring and the windings of the receiving element comprise the windings of the coil spring.

11. The ball screw of claim 9, wherein the guide means include a coiled guide element which is coiled around the shaft and the ball receiver, and a respective coil of the guide element is associated with and moves together with each of the coils of the receiving element with respect to the shaft.

12. The ball screw of claim 11, wherein each respective coil of the guide element is part of and is included in the winding which defines the respective coil of the receiving element and is located outward of the surface of the receiving element in contact with the balls in the respective grooves.

* * * * *